United States Patent
Lin (10) Patent No.: US 11,415,672 B2
(45) Date of Patent: Aug. 16, 2022

(54) METHOD AND APPARATUS FOR GENERATING OBJECT DETECTION BOX, DEVICE, STORAGE MEDIUM, AND VEHICLE

(71) Applicant: BAIDU ONLINE NETWORK TECHNOLOGY (BEIJING) CO., LTD., Beijing (CN)

(72) Inventor: Jian Lin, Beijing (CN)

(73) Assignee: APOLLO INTELLIGENT DRIVING (BEIJING) TECHNOLOGY CO., LTD., Beijing (CN)

(*) Notice: Subject to any disclaimer, the term of this patent is extended or adjusted under 35 U.S.C. 154(b) by 553 days.

(21) Appl. No.: 16/562,090

(22) Filed: Sep. 5, 2019

(65) Prior Publication Data

US 2020/0081095 A1 Mar. 12, 2020

(30) Foreign Application Priority Data

Sep. 7, 2018 (CN) .......................... 201811043506.5

(51) Int. Cl.
*G01S 7/48* (2006.01)
*G06T 7/60* (2017.01)
(Continued)

(52) U.S. Cl.
CPC .......... *G01S 7/4808* (2013.01); *G01S 17/42* (2013.01); *G01S 17/931* (2020.01); *G06T 7/60* (2013.01);
(Continued)

(58) Field of Classification Search
None
See application file for complete search history.

(56) References Cited

U.S. PATENT DOCUMENTS 11,151,788 B2* 10/2021 Chaudhuri ............. G06T 7/579
2010/0296705 A1* 11/2010 Miksa .................... G06T 5/005
382/106
(Continued)

FOREIGN PATENT DOCUMENTS

CN 106407947 A 2/2017
CN 107817502 A 3/2018
(Continued)

OTHER PUBLICATIONS

Office Action of Chinese Application No. 201811043506.5, dated Jul. 27, 2020, 8 pages.
(Continued)

*Primary Examiner* — Heather R Jones
(74) *Attorney, Agent, or Firm* — Fay Sharpe LLP (57) ABSTRACT

The present disclosure provides a method for generating an object detection box, comprises: obtaining a set of point-cloud data frames collected by a radar device within a set period; obtaining, from the set, a first point-cloud data frame corresponding to a first time when an unmanned vehicle is closest to a target object, and obtaining first detection box information corresponding to the target object in the first point-cloud data frame that is obtained through an automatic detection algorithm; determining whether the first detection box information is valid detection box information with respect to a second cloud-point data frame in the set that corresponds to a second time prior to the first time; and determining whether the first detection box information is to be used as final detection box information of the target object in the second point-cloud data frame according to the result of the determination.

20 Claims, 4 Drawing Sheets

(51) Int. Cl.
  *G06T 7/70* (2017.01)
  *G01S 17/42* (2006.01)
  *G01S 17/931* (2020.01)

(52) U.S. Cl.
  CPC ...... *G06T 7/70* (2017.01); *G06T 2207/10028* (2013.01); *G06T 2207/10044* (2013.01); *G06T 2207/30242* (2013.01); *G06T 2207/30252* (2013.01)

(56) References Cited

U.S. PATENT DOCUMENTS

| | | | | |
|---|---|---|---|---|
| 2018/0136651 | A1* | 5/2018 | Levinson | G05D 1/0044 |
| 2019/0180467 | A1* | 6/2019 | Li | G01S 17/931 |
| 2019/0266741 | A1* | 8/2019 | Uehara | G01S 17/931 |

FOREIGN PATENT DOCUMENTS

| | | |
|---|---|---|
| JP | H07129898 A | 5/1995 |
| JP | 2001264436 A | 9/2001 |
| JP | 2017151043 A | 8/2017 |
| JP | 2017166846 A | 9/2017 |
| WO | 2015174178 A1 | 11/2015 |
| WO | 2017167387 A1 | 10/2017 |

OTHER PUBLICATIONS

Office Action of Japanese Application No. 2019-154622, dated Sep. 29, 2020, 6 pages.
Bertozzi et al., "Pedestrian Detection for Driver Assistance Using Multiresolution Infrared Vision", IEEE Transactions on Vehicular Technology, vol. 53, No. 6, Nov. 2004, 13 pates.
Desheng et al., "Obstacle Detection and Tracking for Unmanned Vehicles Based on 3D Laser Radar", 9 pages (English Abstract).
Extended European Search Report for EP Application No. 19195678.8, dated Feb. 10, 2020, 10 pages.
Lai et al., "Detection-based Object Labeling in 3D Scenes", 2012 IEEE International Conference on Robotics and Automation, RiverCentre, Saint Paul, Minnesota, US, May 14-18, 2012, 8 pages.

* cited by examiner

METHOD AND APPARATUS FOR GENERATING OBJECT DETECTION BOX, DEVICE, STORAGE MEDIUM, AND VEHICLE

CROSS REFERENCE TO RELATED APPLICATION

This application claims priority under 35 U.S.C. § 119(a) on Chinese Patent Application No. 201811043506.5, filed with the State Intellectual Property Office of P. R. China on Sep. 7, 2018, the entire contents of which are incorporated herein by reference.

TECHNICAL FIELD

Embodiments of the present disclosure relate to a field of unmanned vehicle technologies, and more particularly to a method and an apparatus for generating an object detection box, a device, a storage medium and a vehicle.

BACKGROUND

A laser radar may be installed in an unmanned vehicle. After the laser radar collects point-cloud data frames, a detection box of a target object in the point-cloud data frames needs to be obtained in a manual annotation way. A three-dimensional position coordinate of a center point of the detection box, the length, width and height of the detection box, and the number of point clouds within the detection box may be obtained according to the annotated detection box.

SUMMARY

Embodiments of the present disclosure provides a method and an apparatus for generating an object detection box based on point-cloud data, a device, a storage medium and a vehicle, to improve accuracy of automatically generation of a detection box of a target object in a point-cloud data frame.

In a first aspect, embodiments of the present disclosure provide a method for generating an object detection box based on point-cloud data. The method comprises: obtaining a set of point-cloud data frames collected by a radar device within a set period; obtaining, from the set, a first point-cloud data frame corresponding to a first time when an unmanned vehicle is closest to a target object, and obtaining first detection box information corresponding to the target object in the first point-cloud data frame that is obtained through an automatic detection algorithm; determining whether the first detection box information is valid detection box information with respect to a second cloud-point data frame in the set that corresponds to a second time prior to the first time; and determining whether the first detection box information is to be used as final detection box information of the target object in the second point-cloud data frame according to the result of the determination.

In a second aspect, embodiments of the present disclosure also provide an apparatus for generating an object detection box based on point-cloud data. The apparatus includes: a point-cloud data frame set obtaining module, a first detection box information obtaining module, a valid detection box information determining module and a final detection box information determining module.

The point-cloud data frame set obtaining module is configured to obtain a set of point-cloud data frames collected by a radar device within a set period.

The first detection box information obtaining module is configured to obtain, from the set, a first point-cloud data frame corresponding to a first time when an unmanned vehicle is closest to a target object, and to obtain first detection box information corresponding to the target object in the first point-cloud data frame that is obtained through an automatic detection algorithm.

The valid detection box information determining module is configured to determine whether the first detection box information is valid detection box information with respect to a second cloud-point data frame in the set that corresponds to a second time prior to the first time.

The final detection box information determining module is configured to determine whether the first detection box information is to be used as final detection box information of the target object in the second point-cloud data frame according to the result of the determination.

In a third aspect, embodiments of the present disclosure also provide an electronic device. The electronic device includes a memory, a processor and a computer program stored in the memory and operated in the processor. When the computer program is executed by the processor, the processor is configured to implement a method for generating an object detection box based on point-cloud data according to embodiments of the present disclosure.

In a fourth aspect, embodiments of the present disclosure also provide a computer-readable storage medium having a computer program stored thereon. When the computer program is executed by a processor, the computer program is configured to implement a method for generating an object detection box based on point-cloud data according to embodiments of the present disclosure.

In a fifth aspect, embodiments of the present disclosure also provide a vehicle. The vehicle comprises a vehicle body, an electronic device according to the third aspect, and a laser radar provided in the vehicle body.

In the embodiments of the present disclosure, a set of point-cloud data frames collected by a radar device within a set period is obtained first; then a first point-cloud data frame corresponding to a first time when an unmanned vehicle is closest to a target object is obtained from the set; and then first detection box information corresponding to the target object in the first point-cloud data frame that is obtained through an automatic detection algorithm is obtained; then it is determined whether the first detection box information is valid detection box information with respect to a second cloud-point data frame in the set that corresponds to a second time prior to the first time; and finally it is determined whether the first detection box information is to be used as final detection box information of the target object in the second point-cloud data frame according to the result of the determination. With the method for generating the object detection box based on the point-cloud data according to the embodiments of the present disclosure, the detection box information of the second point-cloud data frame prior to the first time may be checked backward by utilizing the detection box information of the target object in the first point-cloud data frame that corresponds to the first time when the unmanned vehicle is closest to the target object, and then backward-checked results may be smoothed in a timing sequence, to obtain a stable detection box, thereby improving the accuracy of generating the object detection box.

DETAILED DESCRIPTION

Detailed description will be further made below to the present disclosure with reference to the accompanying drawings and the embodiments. It should be understood that, detailed embodiments described herein are intended only to explain the present disclosure, and are not intended to limit the present disclosure. In addition, it should be further noted that, for the convenience of description, only some contents but not all of the structure related to the present disclosure are illustrated in the accompanying drawings.

It is difficult to perform the manual annotation for the detection box, which requires more manual labor, and has poor extensibility in data sets. Presently, automatic detection algorithms for target objects have been proposed, such as the CNNSeg algorithm. According to the algorithms, the detection box of the target object may be automatically obtained. However, the accuracy of the automatic detection algorithms needs to be improved.

Embodiment 1

Figure 1:
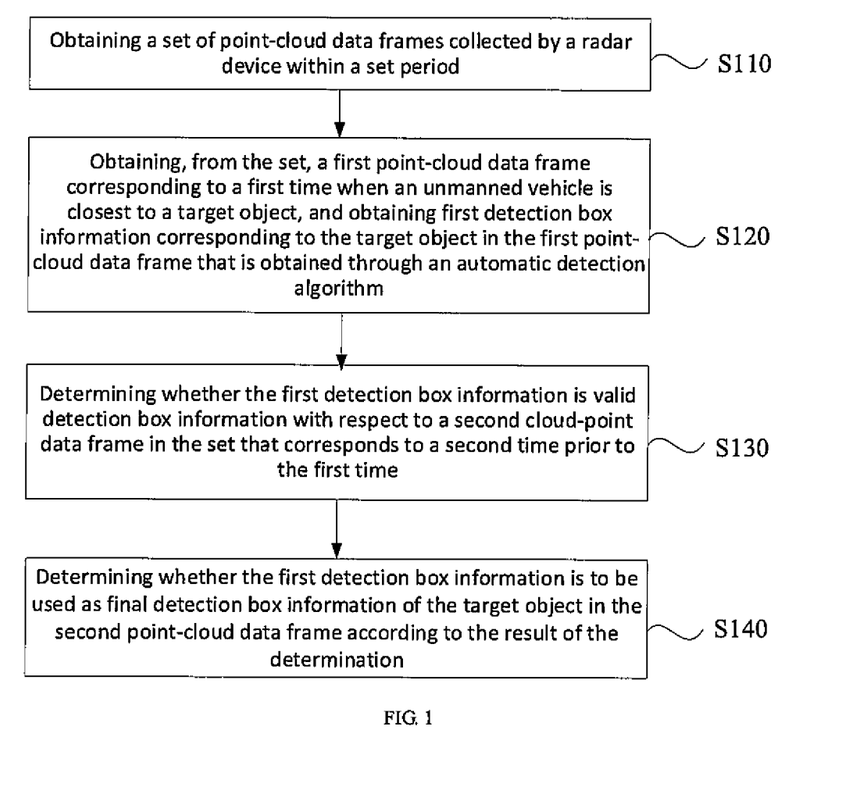
FIG. 1 is a flow chart illustrating a method for generating an object detection box based on point-cloud data in Embodiment 1 of the present disclosure.

FIG. 1 is a flow chart illustrating a method for generating an object detection box based on point-cloud data in Embodiment 1 of the present disclosure. This embodiment may be applicable to a case in which the object detection box is generated based on the point-cloud data in an unmanned vehicle system. The method may be implemented by an apparatus for generating the object detection box based on the point-cloud data. The apparatus may be implemented in software and/or hardware, and may be generally integrated in a device having a function for generating the object detection box based on the point-cloud data. The device may be an electronic device such as a mobile terminal or a vehicle equipment. As illustrated in FIG. 1, the method includes following steps in detail.

At step S110, a set of point-cloud data frames collected by a radar device is obtained within a set period.

The point-cloud data may be obtained through a scanning operation by the radar device. Each point contains three-dimensional coordinate information. In some application scenes, it may also contain color (such as, red-green-blue (RGB)) information or reflection intensity information. The radar device obtains one point-cloud data frame each time the scanning operation is performed. The radar device includes a laser radar or the like.

In this embodiment, during the driving of the unmanned vehicle, the radar device scans for objects in front of the vehicle at a regular interval, and performs the scanning operations for several times within a set period, to obtain the set of the point-cloud data frames.

At step S120, a first point-cloud data frame corresponding to a first time when the unmanned vehicle is closest to a target object is obtained from the set, and first detection box information corresponding to the target object in the first point-cloud data frame. The first detection box information is obtained through an automatic detection algorithm.

The first detection box information may include a three-dimensional coordinate of a central point of the first detection box, a length of the first detection box, a width of the first detection box, a height of the first detection box, and the number of point clouds within the first detection box. In this embodiment, the vehicle is in a driving state, such that distances between the vehicle and the target object are different at each time. Therefore, a distance between the unmanned vehicle and the target object at current time may be obtained by analyzing information contained in the point-cloud data frame collected by the radar device.

Alternatively, obtaining, from the set, the first point-cloud data frame corresponding to the first time when the unmanned vehicle is closest to the target object may be implemented by: obtaining the detection box information of the target object corresponding to each of the point-cloud data frames in the set that is obtained through the automatic detection algorithm, and determining a distance between the target object and the unmanned vehicle in the point-cloud data frame according to the detection box information; and selecting a point-cloud data frame corresponding to the minimum distance, as the first point-cloud data frame corresponding to the first time when the unmanned vehicle is closest to the target object.

The point-cloud data frame may include a plurality of objects. Each object corresponds to one detection box in which the object is located. The detection box information of the target object may be obtained by using the automatic detection algorithm. The distance between the target object and the unmanned vehicle in the point-cloud data frame may be obtained according to the detection box information. Respective point-cloud data frames in the set are collected by the radar device at different times, in which the distances between the target object and the unmanned vehicle are also different. Therefore, the point-cloud data frame corresponding to the minimum distance between the target object and the unmanned vehicle may be determined as the first point-cloud data frame corresponding to the first time when the unmanned vehicle is closest to the target object.

Alternatively, obtaining the first detection box information corresponding to the target object in the first point-cloud data frame that is obtained through the automatic detection algorithm may be implemented by: performing a normalization process on the detection box information of the target object corresponding to each of the point-cloud data frames that is obtained through the automatic detection algorithm within a first sub-period with the first time as a center, so as to obtain the first detection box information corresponding to the target object.

Here, the first sub-period is within the set period, and the start point of the first sub-period is not overlapped with the start time of the set period. Assuming that the set period is [t1, t2], and the first time is t3 that is between t1 and t2, the first sub-period may be set as [t3−Δt, t3+Δt], and t3−Δt is not overlapped with t1. That is, t3−Δt is between t1 and t3.

Specifically, after respective point-cloud data frames within the first sub-period have been obtained, the detection box information corresponding to the target object in each of the point-cloud data frames may be obtained through the automatic detection algorithm. Then, the normalization process is performed on each of the detection box information, to obtain the first detection information corresponding to the target object.

Alternatively, performing the normalization process on the detection box information of the target object corresponding to each of the point-cloud data frames that is obtained through the automatic detection algorithm within the first sub-period with the first time as the center may be implemented by: calculating a weighting coefficient corresponding to each of the point-cloud data frames within the first sub-period with the first time as the center; multiplying the detection box information of the target object corresponding to each of the point-cloud data frames that is obtained through the automatic detection algorithm within the first sub-period by a corresponding weighting coefficient; and adding up the products to obtain a normalized value of the detection box information.

Here, the weighting coefficient corresponding to each of the point-cloud data frames within the first sub-period may be calculated by $$P_i = \frac{e^{-d_i}}{\sum_{i=1}^{n} e^{-d_i}}.$$

$P_i$ indicates a weighting coefficient of i-th point-cloud data frame within the first sub-period. $d_i$ indicates a distance between the target object and the unmanned vehicle in the i-th point-cloud data frame within the first sub-period. n indicates that there are n point-cloud data frames within the first sub-period.

The detection box information may include the three-dimensional coordinate of the central point of the detection box, the length of the detection box, the width of the detection box, the height of the detection box, and the number of the point clouds within the detection box. The normalization process on the detection box information may be performed with respect to the three-dimensional coordinate of the central point of the detection box, the length of the detection box, the width of the detection box, the height of the detection box, and the number of point clouds in the detection box, respectively. For example, taking the length of the detection box as an example, the length of the detection box of the target object in each of the point-cloud data frames within the first sub-period is multiplied by the corresponding weighting coefficient, and then the products are added up to obtain a normalized value of the length of the detection box. For example, assuming that $L_i$ is the length of the detection box of the target object in the i-th point-cloud data frame within the first sub-period, the normalized value of the length of the detection box may be calculated by the equation: $L = P_1 * L_1 + P_2 * L_2 + \ldots P_n L_n$. Here, L indicates the normalized value of the length of the detection box; n indicates that there are n point-cloud data frames within the first sub-period; and Pi indicates the weighting coefficient of the i-th point-cloud data frame within the first sub-period. The calculation for the normalized value of the three-dimensional coordinate of the detection box, the normalized value of the width of the detection box, the normalized value of the height of the detection box, or the normalized value of the number of the point clouds within the detection box may be similar with that for the normalized value of the length of the detection box, which are not elaborated herein.

At step S130, it is determined that whether the first detection box information is valid detection box information with respect to a second cloud-point data frame in the set that corresponds to a second time prior to the first time.

The second time may be any time between the start point of the set period and the start point of the first sub-period. In the above embodiment, the set period is [t1, t2], and the first period is [t3−Δt, t3+Δt]. In such a case, the second time is any time within the period [t1, t3−Δt]. To determine whether the first detection box information is the valid detection box information may be understood as to determine whether the first detection box information may be used as the detection box information of the target object in the second point-cloud data frame. Specifically, after the first detection box information is obtained, it is determined whether the first detection box information is valid with respect to each of second point-cloud data frames.

Alternatively, determining whether the first detection box information is the valid detection box information with respect to the second cloud-point data frame in the set that corresponds to the second time prior to the first time may be implemented by: calculating a confidence value of the first detection box information with respect to each of the second point-cloud data frames in a second sub-period from the start time of the set period to the start point of the first sub-period; wherein, when the confidence value calculated is larger than a set threshold, it is determined that the first detection box information is the valid detection box information with respect to the current second point-cloud data frame, or when the confidence value calculated is not larger than the set threshold, it is determined that the first detection box information is not the valid detection box information with respect to the current second point-cloud data frame.

The set threshold of the confidence value may be any value between 0.7-0.8. Preferably, the set threshold may be set as 0.75.

Alternatively, calculating the confidence value of the first detection box information may be implemented by: obtaining detection boxes in the current second point-cloud data frame that are obtained through the automatic detection algorithm, and searching for ones from the detection boxes that intersect with the first detection box and have an intersected volume greater than the set threshold, as candidate frames;

performing a weighted averaging process on center positions of all the candidate frames by using an intersection over union (IOU) value between each candidate frame and the first detection box as a weight, so as to obtain a center coordinate corresponding to the current second point-cloud data frame; counting the point clouds enclosed by all the candidate frames that fall within the first detection box, and accumulating the counted number to obtain a total number of the point clouds corresponding to the current second point-cloud data frame; and calculating the confidence value of the first detection box information corresponding to the current second point-cloud data frame according to the center coordinate and the total number of the point clouds.

Each detection box is a detection box corresponding to each object included in the point-cloud data frame. The intersected volume greater than the set threshold may indicate that the intersected volume between each detection box and the first detection box is greater than a set ratio to the volume of the first detection box. Preferably, the set ratio may be set as 30%. The IOU value may be calculated by the equation: IOU value=(a volume of an intersection between two detection boxes/a volume of a union between two detection boxes)*100%. For example, assuming that 3 candidate frames are determined in the current second point-cloud data frame, with the coordinates of the center positions (x1, y1, z1), (x2, y2, z2) and (x3, y3, z3) and the IOU values IOU1, IOU2 and IOU3, the center coordinate of the second point-cloud data frame may be:

$$(X, Y, Z) = \frac{IOU1*(x1, y1, z1) + IOU2*(x2, y2, z2) + IOU3*(x3, y3, z3)}{3}.$$

The confidence value of the first detection box information corresponding to the current second point-cloud data frame may be calculated according to the equation: confidence=max (1/(an Euclidean distance between the center coordinate corresponding to the current second point-cloud data frame and the center coordinate of the first detection box+$1e^{-3}$)+the total number of the point clouds corresponding to the current second point-cloud data frame/a total number of the point clouds within the first detection box, 1). Here, "confidence" indicates the confidence value. Here, the Euclidean distance may be calculated by the equation:

$$d=((X1-X2)^2+(Y1-Y2)^2+(Z1-Z2)^2)^{1/2}.$$

Here, (X1, Y1, Z1) is the center coordinate corresponding to the current second point-cloud data frame, and (X2, Y2, Z2) is the center coordinate of the first detection box. Assuming that A=1/(an Euclidean distance between the center coordinate corresponding to the current second point-cloud data frame and the center coordinate of the first detection box+$1e^{-3}$)+the total number of the point clouds corresponding to the current second point-cloud data frame/a total number of the point clouds within the first detection box), the confidence value is the maximum of A and 1.

At step S140, it is determined that whether the first detection box information is to be used as final detection box information of the target object in the second point-cloud data frame according to the result of the determination.

The result of the determination includes the determination that the first detection box information is the valid detection box information with respect to the current second point-cloud data frame, or the determination that the first detection box information is not the valid detection box information with respect to the current second point-cloud data frame. When the first detection box information is the valid detection box information with respect to the current second point-cloud data frame, the first detection box information may be used as the final detection box information of the target object in the current second point-cloud data frame.

Alternatively, the method may further comprises: recording a first value when it is determined that the first detection box information is the valid detection box information with respect to the current second point-cloud data frame; and recording a second value when it is determined that the first detection box information is not the valid detection box information with respect to the current second point-cloud data frame.

Here, the first value may be recorded as 1, and the second value may be recorded as 0.

Accordingly, determining whether the first detection box information is to be used as the final detection box information of the target object in the second point-cloud data frame according to the result of the determination, comprises: performing a smoothing process on the generated sequence of the values; and selecting a target subsequence from the smoothed sequence of the values, and using the first detection box information as the final detection box information of the target object in each point-cloud data frame corresponding to the target subsequence.

Here, the target subsequence is a subsequence consisting of continuous first values in the sequence of the values and having the longest length. Performing the smoothing process on the generated sequence of the values, comprises: setting the second value to be the first value, when there are at least two first values on the left of the second value and at least two first values on the right of the second value in the generated sequence of the values; and setting the first value to be the second value, when there are at least two second values on the left of the first value and at least two second values on the right of the first value in the generated sequence of the values. For example, assuming that the generated sequence of the values is 111011, there are three values "1" on the left side of the value "0", and there are two values "1" on the right side of the value "0". Accordingly, the value "0" is set to be the value "1".

Specifically, after the smoothing process is performed on the sequence of the values, a subsequence consisting of continuous first values and continuous second values may be included in the sequence of the values. A subsequence consisting of continuous first values and having the longest length may be determined as the target subsequence, and the first detection box information may be used as the final detection box information of the target object in each point-cloud data frame corresponding to the target subsequence.

In the embodiments of the present disclosure, a set of point-cloud data frames collected by a radar device within a set period is obtained first; then a first point-cloud data frame corresponding to a first time when an unmanned vehicle is closest to a target object is obtained from the set; and then first detection box information corresponding to the target object in the first point-cloud data frame that is obtained through an automatic detection algorithm is obtained; then it is determined whether the first detection box information is valid detection box information with respect to a second cloud-point data frame in the set that corresponds to a second time prior to the first time; and finally it is determined whether the first detection box information is to be used as final detection box information of the target object in the second point-cloud data frame according to the result of the determination. With the method for generating the object detection box based on the point-cloud data according to the embodiments of the present disclosure, the detection box information of the second point-cloud data frame prior to the first time may be checked backward by utilizing the detection box information of the target object in the first point-cloud data frame that corresponds to the first time when the unmanned vehicle is closest to the target object, and then backward-checked results may be smoothed in a timing sequence, to obtain a stable detection box, thereby improving the accuracy of generating the object detection box.

Figure 2:
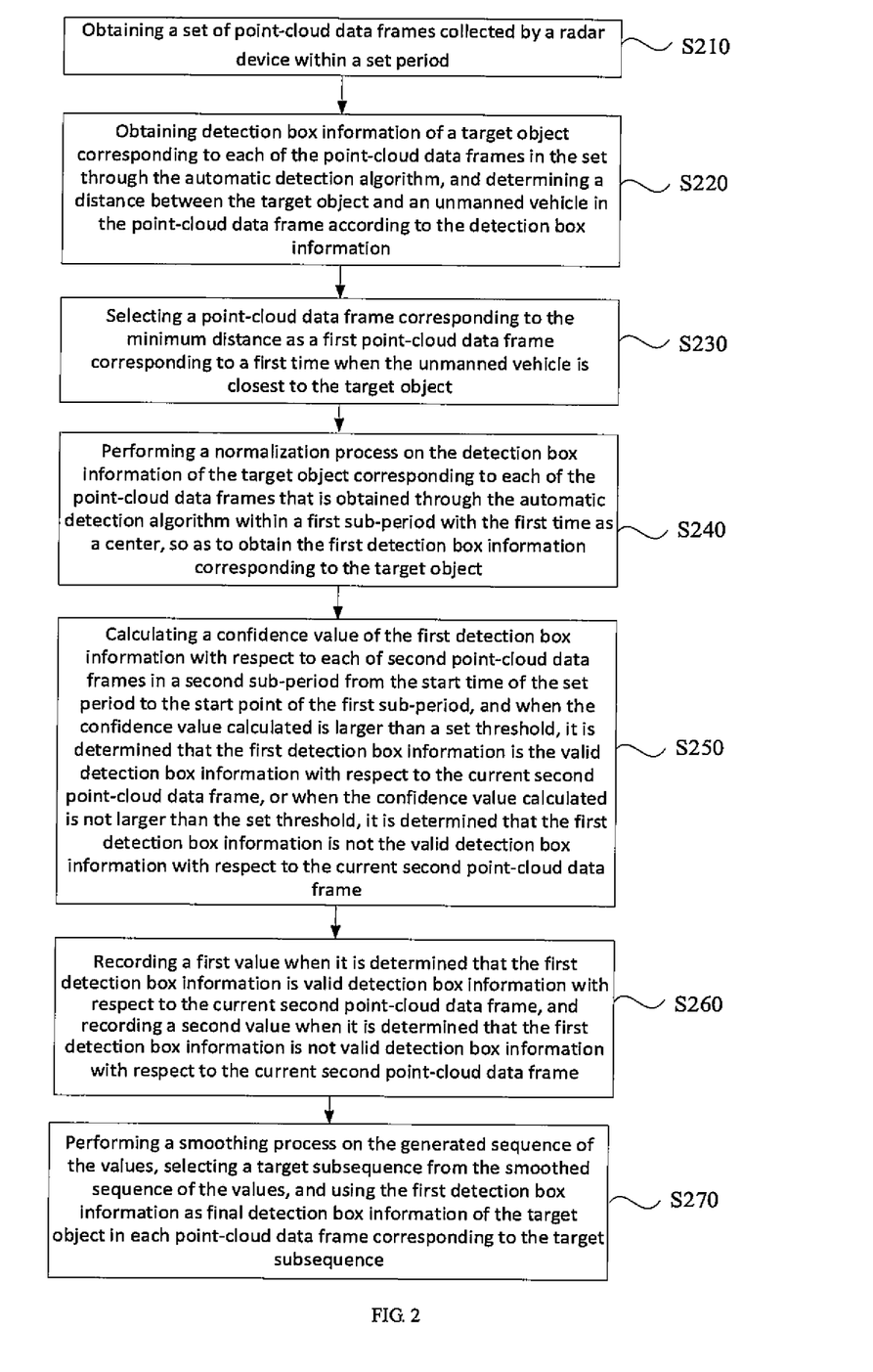
FIG. 2 is a flow chart illustrating another method for generating an object detection box based on point-cloud data in Embodiment 1 of the present disclosure.

FIG. 2 is a flow chart illustrating another method for generating an object detection box based on point-cloud data in Embodiment 1 of the present disclosure, which further explains the above embodiment. As illustrated in FIG. 2, the method includes following steps.

At step S210, a set of point-cloud data frames collected by a radar device is obtained within a set period.

At step S220, detection box information of a target object corresponding to each of the point-cloud data frames in the set is obtained through the automatic detection algorithm; and a distance between the target object and an unmanned vehicle in the point-cloud data frame is determined according to the detection box information.

At step S230, a point-cloud data frame corresponding to the minimum distance is selected as a first point-cloud data frame corresponding to a first time when the unmanned vehicle is closest to the target object.

At step S240, a normalization process is performed on the detection box information of the target object corresponding to each of the point-cloud data frames that is obtained through the automatic detection algorithm within a first sub-period with the first time as a center, so as to obtain the first detection box information corresponding to the target object.

At step S250, a confidence value of the first detection box information is calculated with respect to each of second point-cloud data frames in a second sub-period from the start time of the set period to the start point of the first sub-period; wherein, when the confidence value calculated is larger than a set threshold, it is determined that the first detection box information is the valid detection box information with respect to the current second point-cloud data frame, or when the confidence value calculated is not larger than the set threshold, it is determined that the first detection box information is not the valid detection box information with respect to the current second point-cloud data frame.

At step S260, a first value is recorded when it is determined that the first detection box information is valid detection box information with respect to the current second point-cloud data frame; and a second value is recorded when it is determined that the first detection box information is not valid detection box information with respect to the current second point-cloud data frame.

At step S270, a smoothing process is performed on the generated sequence of the values; a target subsequence is selected from the smoothed sequence of the values; and the first detection box information is used as final detection box information of the target object in each point-cloud data frame corresponding to the target subsequence.

Embodiment 2

Figure 3:
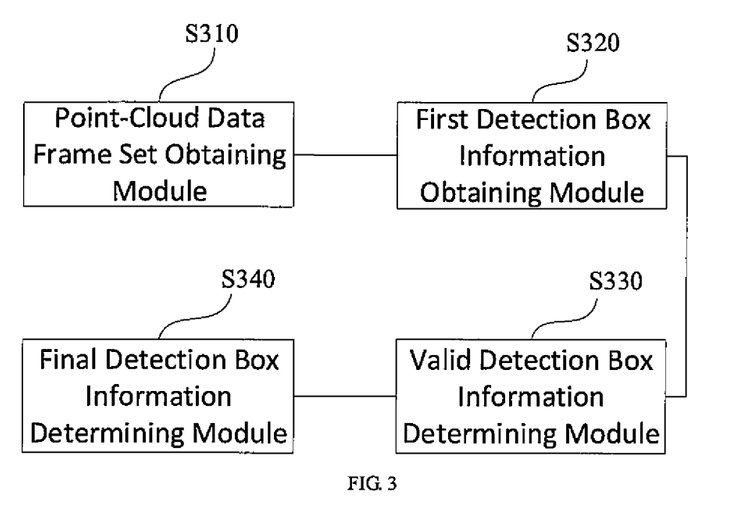
FIG. 3 is a schematic diagram illustrating an apparatus for generating an object detection box based on point-cloud data in Embodiment 2 of the present disclosure.

FIG. 3 is a schematic diagram illustrating an apparatus for generating an object detection box based on point-cloud data in Embodiment 2 of the present disclosure. As illustrated in FIG. 3, the apparatus includes: a point-cloud data frame set obtaining module 310, a first detection box information obtaining module 320, a valid detection box information determining module 330 and a final detection box information determining module 340.

The point-cloud data frame set obtaining module 310 is configured to obtain a set of point-cloud data frames collected by a radar device within a set period.

The first detection box information obtaining module 320 is configured to obtain, from the set, a first point-cloud data frame corresponding to a first time when an unmanned vehicle is closest to a target object, and to obtain first detection box information corresponding to the target object in the first point-cloud data frame that is obtained through an automatic detection algorithm.

The valid detection box information determining module 330 is configured to determine whether the first detection box information is valid detection box information with respect to a second cloud-point data frame in the set that corresponds to a second time prior to the first time.

The final detection box information determining module 340 is configured to determine whether the first detection box information is to be used as final detection box information of the target object in the second point-cloud data frame according to the result of the determination.

Alternatively, the first detection box information obtaining module 320 is also configured: to obtain the detection box information of the target object corresponding to each of the point-cloud data frames in the set that is obtained through the automatic detection algorithm, and determining a distance between the target object and the unmanned vehicle in the point-cloud data frame according to the detection box information; and to select a point-cloud data frame corresponding to the minimum distance, as the first point-cloud data frame corresponding to the first time when the unmanned vehicle is closest to the target object.

Alternatively, the first detection box information obtaining module 320 is also configured: to perform a normalization process on the detection box information of the target object corresponding to each of the point-cloud data frames that is obtained through the automatic detection algorithm within a first sub-period with the first time as a center, so as to obtain the first detection box information corresponding to the target object, wherein, the first sub-period is within the set period, and the start point of the first sub-period is not overlapped with the start time of the set period.

Alternatively, the first detection box information obtaining module 320 is also configured: to calculate a weighting coefficient corresponding to each of the point-cloud data frames within the first sub-period with the first time as the center; to multiply the detection box information of the target object corresponding to each of the point-cloud data frames that is obtained through the automatic detection algorithm within the first sub-period by a corresponding weighting coefficient; and to add up the products to obtain a normalized value of the detection box information.

Alternatively, the valid detection box information determining module 330 is also configured: to calculate a confidence value of the first detection box information with respect to each of the second point-cloud data frames in a second sub-period from the start time of the set period to the start point of the first sub-period; wherein, when the confidence value calculated is larger than a set threshold, it is determined that the first detection box information is the valid detection box information with respect to the current second point-cloud data frame, or when the confidence value calculated is not larger than the set threshold, it is determined that the first detection box information is not the valid detection box information with respect to the current second point-cloud data frame.

Alternatively, the apparatus also includes: a first value recording module and a second value recording module. The first value recording module is configured to record a first value when it is determined that the first detection box information is the valid detection box information with respect to the current second point-cloud data frame. The second value recording module is configured to record a second value when it is determined that the first detection box information is not the valid detection box information with respect to the current second point-cloud data frame.

Alternatively, the final detection box information determining module 340 is also configured: to perform a smoothing process on the generated sequence of the values; and to select a target subsequence from the smoothed sequence of the values, and using the first detection box information as the final detection box information of the target object in each point-cloud data frame corresponding to the target subsequence, wherein, the target subsequence is a subsequence consisting of continuous first values in the sequence of the values and having the longest length.

Alternatively, the final detection box information determining module 340 is also configured: to set the second value to be the first value, when there are at least two first values on the left of the second value and at least two first values on the right of the second value in the generated sequence of the values; and to set the first value to be the second value, when there are at least two second values on the left of the first value and at least two second values on the right of the first value in the generated sequence of the values.

Alternatively, the valid detection box information determining module 330 is also configured: to obtain detection boxes in the current second point-cloud data frame that are obtained through the automatic detection algorithm, and to search for ones from the detection boxes that intersect with the first detection box and have an intersected volume greater than the set threshold, as candidate frames; to perform a weighted averaging process on center positions of all the candidate frames by using an intersection over union (IOU) value between each candidate frame and the first detection box as a weight, so as to obtain a center coordinate corresponding to the current second point-cloud data frame; to count the point clouds enclosed by all the candidate frames that fall within the first detection box, and accumulating the counted number to obtain a total number of the point clouds corresponding to the current second point-cloud data frame; and to calculate the confidence value of the first detection box information corresponding to the current second point-cloud data frame according to the center coordinate and the total number of the point clouds.

Alternatively, the confidence value of the first detection box information corresponding to the current second point-cloud data frame is calculated according to the following equation:

confidence=max (1/(an Euclidean distance between the center coordinate corresponding to the current second point-cloud data frame and the center coordinate of the first detection box+$1e^{-3}$)+ the total number of the point clouds corresponding to the current second point-cloud data frame/a total number of the point clouds within the first detection box, 1), wherein, "confidence" indicates the confidence value.

Alternatively, the first detection box information comprises: a three-dimensional coordinate of the center point of the first detection box, a length of the first detection box, a width of the first detection box, a height of the first detection box, and the number of point clouds within the first detection box.

The above apparatus may execute the method provided by all embodiments of the present disclosure described above, which has corresponding function modules and beneficial effect of the above method. Technical details not described in detail in this embodiment may refer to the method provided by all the embodiments of the present disclosure described above.

It is to be noted that, the embodiments of the present disclosure may be applied to a case in which the unmanned vehicle is in a moving state and the target object is in a static state, such as a case in which a row of vehicles are parked by the road and the unmanned vehicle passes through the road. Any vehicle parked by the road may be used as the target object.

Embodiment 3

Figure 4:
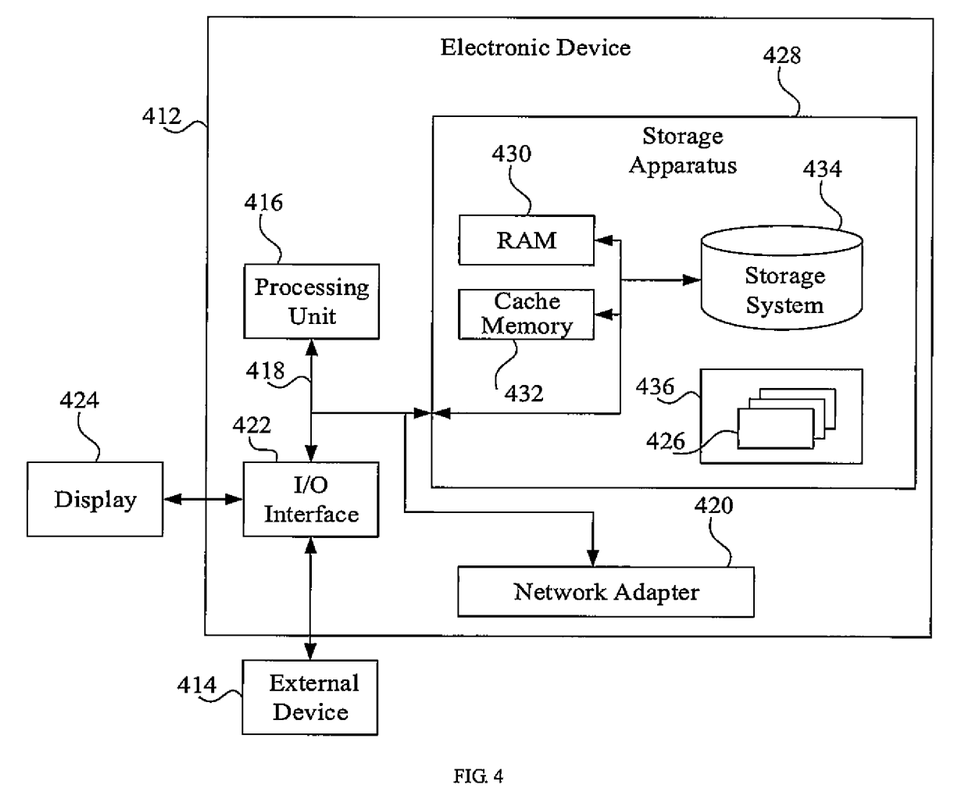
FIG. 4 is a schematic diagram illustrating an electronic device provided in Embodiment 3 of the present disclosure.

FIG. 4 is a schematic diagram illustrating an electronic provided in Embodiment 3 of the present disclosure. FIG. 4 illustrates a block diagram of an exemplary electronic device 412 applicable to implement implementations of the present disclosure. The electronic device 412 illustrated in FIG. 4 is only an example, which may not bring any limitation to functions and scope of embodiments of the present disclosure. The electronic device 412 is typically a computing device having a generation function of an object detection box based on point cloud data.

As illustrated in FIG. 4, the electronic device 412 is embodied in the form of a general-purpose computing device. Components of the electronic device 412 may include but not limited to: one or more processors or processing units 416, a storage apparatus 428, and a bus 418 connecting different system components (including the storage apparatus 428 and the processing unit 416).

The bus 418 indicates one or more of several bus structures, including a storage bus or a storage controller, a peripheral bus, an accelerated graphics port and a processor or a local bus with any bus structure in the plurality of bus structures. For example, these architectures include but not limited to an industry standard architecture (ISA) bus, a micro channel architecture (MAC) bus, an enhanced ISA bus, a video electronics standards association (VESA) local bus and a peripheral component interconnection (PCI) bus.

The electronic device 412 typically includes a plurality of computer system readable mediums. These mediums may be any usable medium that may be accessed by the electronic device 412, including volatile and non-volatile mediums, removable and non-removable mediums.

The storage apparatus 428 may include computer system readable mediums in the form of volatile medium, such as a random access memory (RAM) 430 and/or a cache memory 432. The electronic device 412 may further include other removable/non-removable, volatile/non-volatile computer system storage mediums. Only as an example, the storage system 434 may be configured to read from and write to non-removable, non-volatile magnetic mediums (not illustrated in FIG. 4, and usually called "a hard disk driver"). Although not illustrated in FIG. 4, a magnetic disk driver configured to read from and write to the removable non-volatile magnetic disc (such as "a diskette"), and an optical disc driver configured to read from and write to a removable non-volatile optical disc (such as a compact disc-read only memory (CD-ROM), a digital video disc-read only memory (DVD-ROM) or other optical mediums) may be provided. Under these circumstances, each driver may be connected with the bus 418 by one or more data medium interfaces. The storage apparatus 428 may include at least one program product. The program product has a set of program modules (for example, at least one program module), and these program modules are configured to execute functions of respective embodiments of the present disclosure.

A program 436, having a set (at least one) of program modules 426, may be stored in the storage apparatus 428. Such program modules 426 include but not limited to an operating system, one or more application programs, other program modules, and program data. Each or any combination of these examples may include an implementation of a networking environment. The program module 426 usually executes functions and/or methods described in embodiments of the present disclosure.

The electronic device 412 may communicate with one or more external devices 414 (such as a keyboard, a pointing device, and a display 424), may further communicate with one or more devices enabling a user to interact with the electronic device 412, and/or may communicate with any device (such as a network card, and a modem) enabling the electronic device 412 to communicate with one or more other computing devices. Such communication may occur via an input/output (I/O) interface 22. Moreover, the electronic device 412 may further communicate with one or more networks (such as local area network (LAN), wide area network (WAN) and/or public network, such as Internet) via a network adapter 420. As illustrated in FIG. 4, the network adapter 420 communicates with other modules of the electronic device 412 via the bus 418. It should be understood that, although not illustrated in FIG. 4, other hardware and/or software modules may be used in combination with the electronic device 412, including but not limited to: microcode, device drivers, redundant processing units, external disk drive arrays, RAID (redundant array of independent disks) systems, tape drives, and data backup storage systems, etc.

The processor 16, by operating programs stored in the storage apparatus 428, executes various function applications and data processing, for example implements a method for generating an object detection box based on point-cloud data provided in embodiments of the present disclosure.

Embodiment 4

Embodiment 4 of the present disclosure also provides a computer-readable storage medium having a computer program stored thereon. When executed by a computer processor, the computer program is configured to implement a method for generating an object detection box based on point-cloud data provided in embodiments of the present disclosure.

Embodiments of the present disclosure provide the computer-readable storage medium. The computer program is not limited to a method operation described above, which may also execute related operations in a method for generating an object detection box based on point-cloud data provided according to any embodiment of the present disclosure.

The computer storage medium in embodiments of the present disclosure may employ any combination of one or more computer readable mediums. The computer readable medium may be a computer-readable signal medium or a computer-readable storage medium. The computer-readable storage medium may be, for example, but not limited to an electronic, magnetic, optical, electromagnetic, infrared, or semiconductor system, apparatus or device, or any suitable combination of the foregoing. More specific examples (a non-exhaustive list) of the computer-readable storage medium may include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical memory device, a magnetic memory device, or any appropriate combination of the foregoing. In this document, the computer-readable storage medium can be any tangible medium that contains or stores a program. The program can be used by or in conjunction with an instruction execution system, apparatus or device.

The computer-readable signal medium may include a data signal transmitted in the baseband or as part of a carrier, in which computer-readable program codes are carried. The transmitted data signal may employ a plurality of forms, including but not limited to an electromagnetic signal, a light signal or any suitable combination thereof. The computer-readable signal medium may further be any computer readable medium other than the computer-readable storage medium. The computer readable medium may send, propagate or transmit programs configured to be used by or in combination with an instruction execution system, apparatus or device.

The program codes included in the computer readable medium may be transmitted by any appropriate medium, including but not limited to wireless, electric wire, optical cable, RF (Radio Frequency), or any suitable combination of the foregoing.

The computer program codes for executing operations of the present disclosure may be programmed using one or more programming languages or the combination thereof. The programming languages include object-oriented programming languages, such as Java, Smalltalk, C++, and further include conventional procedural programming languages, such as the C programming language or similar programming languages. The program codes may be executed entirely on a user computer, partly on the user computer, as a stand-alone software package, partly on the user computer and partly on a remote computer, or entirely on the remote computer or server. In the scenario involving the remote computer, the remote computer may be connected to the user computer through any type of network, including a local area network (LAN) or a wide area network (WAN), or may be connected to an external computer (for example, through the Internet using an Internet service provider).

Figure 5:
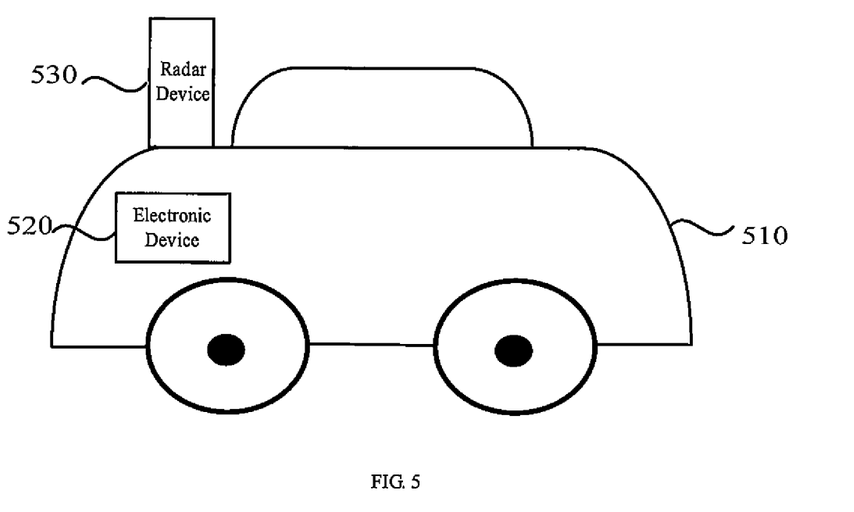
FIG. 5 is a schematic diagram illustrating a vehicle provided in Embodiment 4 of the present disclosure.

Further, FIG. 5 is a schematic diagram illustrating a vehicle provided in Embodiment 4 of the present disclosure. As illustrated in FIG. 5, the vehicle includes a vehicle body 510, the electronic device 520 described by the above embodiments and a radar device 530 provided in the vehicle body.

The above is only an optimal embodiment of the present disclosure and technical principle applied thereto. It should be understood by the skilled in the art that, the present disclosure is not limited to the specific embodiment described herein. The skilled in the art may make various obvious changes, modifications and alternatives without departing from the scope of the present disclosure. Therefore, although a specific illumination is made to the present disclosure by the above embodiments, the present disclosure is not merely limited to the above embodiments. More other equivalent embodiments may also be included without departing from the technical idea of the present disclosure. The scope of the present disclosure is determined by the appended claims.

What is claimed is:

1. A method for generating an object detection box based on point-cloud data, comprising:
obtaining a set of point-cloud data frames collected by a radar device within a set period;
obtaining, from the set, a first point-cloud data frame corresponding to a first time when an unmanned vehicle is closest to a target object, and obtaining first detection box information corresponding to the target object in the first point-cloud data frame that is obtained through an automatic detection algorithm;
determining whether the first detection box information is valid detection box information with respect to a second cloud-point data frame in the set that corresponds to a second time prior to the first time; and
determining whether the first detection box information is to be used as final detection box information of the target object in the second point-cloud data frame according to the result of the determination.

2. The method of claim 1, wherein, obtaining, from the set, the first point-cloud data frame corresponding to the first time when the unmanned vehicle is closest to the target object, comprises:
obtaining the detection box information of the target object corresponding to each of the point-cloud data frames in the set that is obtained through the automatic detection algorithm, and determining a distance between the target object and the unmanned vehicle in the point-cloud data frame according to the detection box information; and
selecting a point-cloud data frame corresponding to the minimum distance, as the first point-cloud data frame corresponding to the first time when the unmanned vehicle is closest to the target object.

3. The method of claim 1, wherein, obtaining the first detection box information corresponding to the target object in the first point-cloud data frame that is obtained through the automatic detection algorithm, comprises:
performing a normalization process on the detection box information of the target object corresponding to each of the point-cloud data frames that is obtained through the automatic detection algorithm within a first sub-period with the first time as a center, so as to obtain the first detection box information corresponding to the target object,
wherein, the first sub-period is within the set period, and the start point of the first sub-period is not overlapped with the start time of the set period.

4. The method of claim 3, wherein, performing the normalization process on the detection box information of the target object corresponding to each of the point-cloud data frames that is obtained through the automatic detection algorithm within the first sub-period with the first time as the center, comprises:
calculating a weighting coefficient corresponding to each of the point-cloud data frames within the first sub-period with the first time as the center;
multiplying the detection box information of the target object corresponding to each of the point-cloud data frames that is obtained through the automatic detection algorithm within the first sub-period by a corresponding weighting coefficient; and
adding up the products to obtain a normalized value of the detection box information.

5. The method of claim 3, wherein, determining whether the first detection box information is the valid detection box information with respect to the second cloud-point data frame in the set that corresponds to the second time prior to the first time, comprises:
calculating a confidence value of the first detection box information with respect to each of the second point-cloud data frames in a second sub-period from the start time of the set period to the start point of the first sub-period,
wherein, when the confidence value calculated is larger than a set threshold, it is determined that the first detection box information is the valid detection box information with respect to the current second point-cloud data frame, or
when the confidence value calculated is not larger than the set threshold, it is determined that the first detection box information is not the valid detection box information with respect to the current second point-cloud data frame.

6. The method of claim 5, further comprising:
recording a first value when it is determined that the first detection box information is the valid detection box information with respect to the current second point-cloud data frame; and
recording a second value when it is determined that the first detection box information is not the valid detection box information with respect to the current second point-cloud data frame,
wherein, determining whether the first detection box information is to be used as the final detection box information of the target object in the second point-cloud data frame according to the result of the determination, comprises:
performing a smoothing process on the generated sequence of the values; and
selecting a target subsequence from the smoothed sequence of the values, and using the first detection box information as the final detection box information of the target object in each point-cloud data frame corresponding to the target subsequence,
wherein, the target subsequence is a subsequence consisting of continuous first values in the sequence of the values and having the longest length.

7. The method of claim 6, wherein, performing the smoothing process on the generated sequence of the values, comprises:
setting the second value to be the first value, when there are at least two first values on the left of the second value and at least two first values on the right of the second value in the generated sequence of the values; and
setting the first value to be the second value, when there are at least two second values on the left of the first value and at least two second values on the right of the first value in the generated sequence of the values.

8. The method of claim 5, wherein, calculating the confidence values of the first detection box information, comprises:
obtaining detection boxes in the current second point-cloud data frame that are obtained through the automatic detection algorithm, and searching for ones from the detection boxes that intersect with the first detection box and have an intersected volume greater than the set threshold, as candidate frames;
performing a weighted averaging process on center positions of all the candidate frames by using an intersection over union (IOU) value between each candidate frame and the first detection box as a weight, so as to obtain a center coordinate corresponding to the current second point-cloud data frame;
counting the point clouds enclosed by all the candidate frames that fall within the first detection box, and accumulating the counted number to obtain a total number of the point clouds corresponding to the current second point-cloud data frame; and
calculating the confidence value of the first detection box information corresponding to the current second point-cloud data frame according to the center coordinate and the total number of the point clouds.

9. The method of claim 8, wherein, the confidence value of the first detection box information corresponding to the current second point-cloud data frame is calculated according to the following equation:

confidence=max (1/(an Euclidean distance between the center coordinate corresponding to the current second point-cloud data frame and the center coordinate of the first detection box+$1e^{-3}$)+ the total number of the point clouds corresponding to the current second point-cloud data frame/a total number of the point clouds within the first detection box, 1), wherein, "confidence" indicates the confidence value.

10. The method of claim 1, wherein, the first detection box information comprises: a three-dimensional coordinate of the center point of the first detection box, a length of the first detection box, a width of the first detection box, a height of the first detection box, and the number of point clouds within the first detection box.

11. An apparatus for generating an object detection box based on point-cloud data, comprising:
a memory;
a processor; and
a computer program stored in the memory and operated in the processor,
wherein, when the computer program is executed by the processor, the processor is configured to implement a method for generating an object detection box based on point-cloud data, comprising:
obtaining a set of point-cloud data frames collected by a radar device within a set period;
obtaining, from the set, a first point-cloud data frame corresponding to a first time when an unmanned vehicle is closest to a target object, and obtaining first detection box information corresponding to the target object in the first point-cloud data frame that is obtained through an automatic detection algorithm;
determining whether the first detection box information is valid detection box information with respect to a second cloud-point data frame in the set that corresponds to a second time prior to the first time; and
determining whether the first detection box information is to be used as final detection box information of the target object in the second point-cloud data frame according to the result of the determination.

12. The apparatus of claim 11, wherein, when the processor is configured to obtain, from the set, the first point-cloud data frame corresponding to the first time when the unmanned vehicle is closest to the target object, the processor is configured to:
obtain the detection box information of the target object corresponding to each of the point-cloud data frames in the set that is obtained through the automatic detection algorithm, and determine a distance between the target object and the unmanned vehicle in the point-cloud data frame according to the detection box information; and
select a point-cloud data frame corresponding to the minimum distance, as the first point-cloud data frame corresponding to the first time when the unmanned vehicle is closest to the target object.

13. The apparatus of claim 11, wherein, when the processor is configured to obtain the first detection box information corresponding to the target object in the first point-cloud data frame that is obtained through the automatic detection algorithm, the processor is configured to:
perform a normalization process on the detection box information of the target object corresponding to each of the point-cloud data frames that is obtained through the automatic detection algorithm within a first sub-period with the first time as a center, so as to obtain the first detection box information corresponding to the target object,
wherein, the first sub-period is within the set period, and the start point of the first sub-period is not overlapped with the start time of the set period.

14. The apparatus of claim 13, wherein, when the processor is configured to perform the normalization process on the detection box information of the target object corresponding to each of the point-cloud data frames that is obtained through the automatic detection algorithm within the first sub-period with the first time as the center, the processor is configured to:
calculate a weighting coefficient corresponding to each of the point-cloud data frames within the first sub-period with the first time as the center;
multiply the detection box information of the target object corresponding to each of the point-cloud data frames that is obtained through the automatic detection algorithm within the first sub-period by a corresponding weighting coefficient; and
add up the products to obtain a normalized value of the detection box information.

15. The apparatus of claim 13, wherein, when the processor is configured to determine whether the first detection box information is the valid detection box information with respect to the second cloud-point data frame in the set that corresponds to the second time prior to the first time, the processor is configured to:
calculate a confidence value of the first detection box information with respect to each of the second point-cloud data frames in a second sub-period from the start time of the set period to the start point of the first sub-period,
wherein, when the confidence value calculated is larger than a set threshold, it is determined that the first detection box information is the valid detection box information with respect to the current second point-cloud data frame, or
when the confidence value calculated is not larger than the set threshold, it is determined that the first detection box information is not the valid detection box information with respect to the current second point-cloud data frame.

16. The apparatus of claim 15, wherein the processor is further configured to:
record a first value when it is determined that the first detection box information is the valid detection box information with respect to the current second point-cloud data frame; and
record a second value when it is determined that the first detection box information is not the valid detection box information with respect to the current second point-cloud data frame,
wherein, when the processor is configured to determine whether the first detection box information is to be used as the final detection box information of the target object in the second point-cloud data frame according to the result of the determination, the processor is configured to:
perform a smoothing process on the generated sequence of the values; and
select a target subsequence from the smoothed sequence of the values, and use the first detection box information as the final detection box information of the target object in each point-cloud data frame corresponding to the target subsequence,
wherein, the target subsequence is a subsequence consisting of continuous first values in the sequence of the values and having the longest length.

17. The apparatus of claim 16, wherein, when the processor is configured to perform the smoothing process on the generated sequence of the values, the processor is configured to:
- set the second value to be the first value, when there are at least two first values on the left of the second value and at least two first values on the right of the second value in the generated sequence of the values; and
- set the first value to be the second value, when there are at least two second values on the left of the first value and at least two second values on the right of the first value in the generated sequence of the values.

18. The apparatus of claim 15, wherein, when the processor is configured to calculate the confidence values of the first detection box information, the processor is configured to:
- obtain detection boxes in the current second point-cloud data frame that are obtained through the automatic detection algorithm, and search for ones from the detection boxes that intersect with the first detection box and have an intersected volume greater than the set threshold, as candidate frames;
- perform a weighted averaging process on center positions of all the candidate frames by using an intersection over union (IOU) value between each candidate frame and the first detection box as a weight, so as to obtain a center coordinate corresponding to the current second point-cloud data frame;
- count the point clouds enclosed by all the candidate frames that fall within the first detection box, and accumulate the counted number to obtain a total number of the point clouds corresponding to the current second point-cloud data frame; and
- calculate the confidence value of the first detection box information corresponding to the current second point-cloud data frame according to the center coordinate and the total number of the point clouds.

19. The apparatus of claim 11, wherein, the apparatus is installed in a vehicle.

20. A non-transitory computer-readable storage medium having a computer program stored thereon,
- wherein, when the computer program is executed by a processor, the computer program implements a method for generating an object detection box based on point-cloud data, comprising:
- obtaining a set of point-cloud data frames collected by a radar device within a set period;
- obtaining, from the set, a first point-cloud data frame corresponding to a first time when an unmanned vehicle is closest to a target object, and obtaining first detection box information corresponding to the target object in the first point-cloud data frame that is obtained through an automatic detection algorithm;
- determining whether the first detection box information is valid detection box information with respect to a second cloud-point data frame in the set that corresponds to a second time prior to the first time; and
- determining whether the first detection box information is to be used as final detection box information of the target object in the second point-cloud data frame according to the result of the determination.

* * * * *